United States Patent Office 3,489,678
Patented Jan. 13, 1970

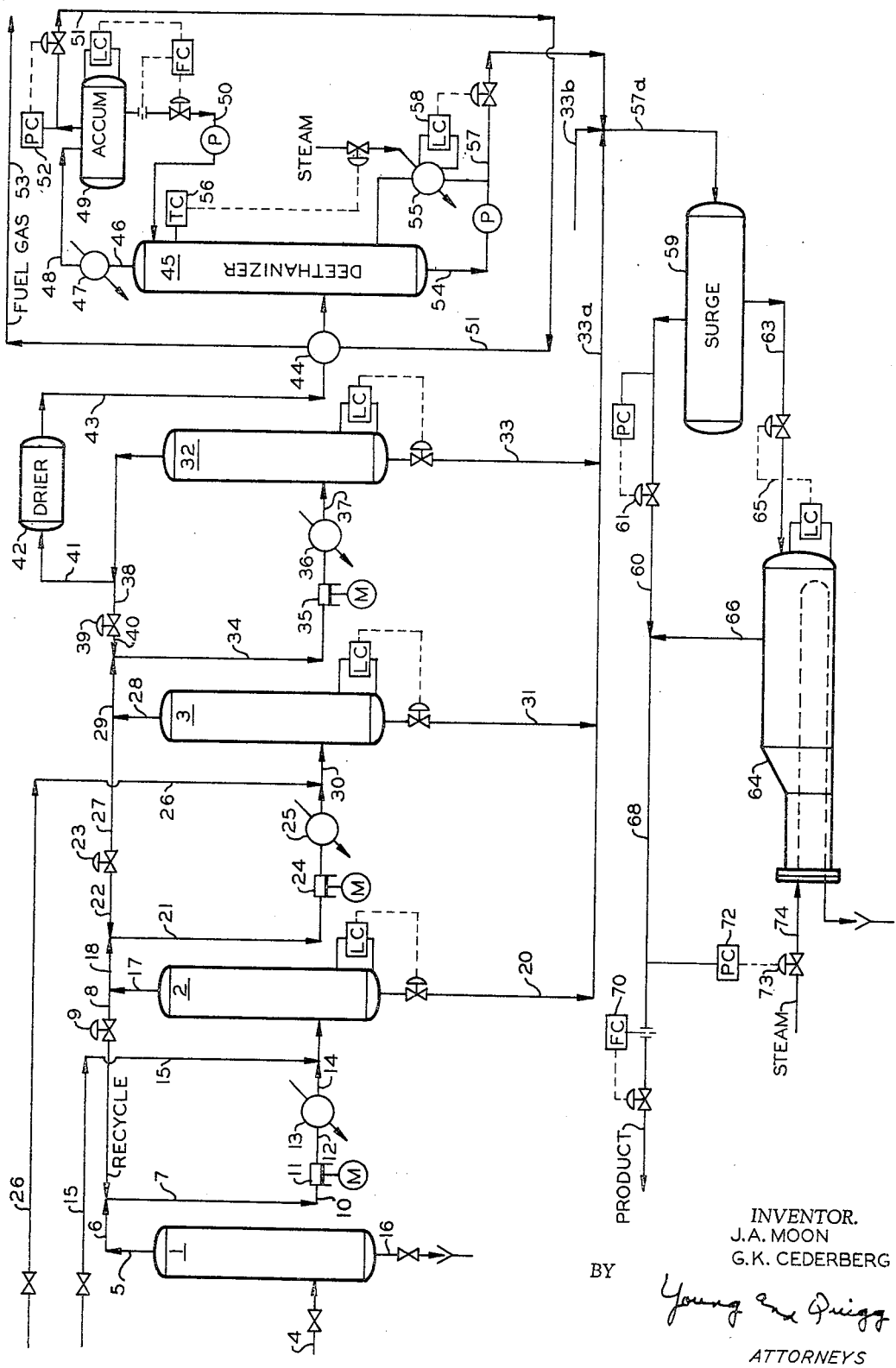

3,489,678
PRECLUDING LIQUID FROM A COMPRESSING ZONE
John A. Moon and George K. Cederberg, Bartlesville, Okla., assignors to Phillips Petroleum Company, a corporation of Delaware
Filed Nov. 28, 1966, Ser. No. 597,441
Int. Cl. C10g 5/06
U.S. Cl. 208—340                          4 Claims

ABSTRACT OF THE DISCLOSURE

Liquid formation in and addition to a compressing zone is prevented by cooling the compressor effluent to partially liquefy said effluent, separating the thus cooled stream into liquid and gaseous streams, and recycling a portion of the separated gaseous stream to the feed to said compressing zone.

---

This invention relates to a method of precluding liquid from a compressing zone.

In another aspect, the invention relates to a method of preventing liquid addition to a compressing zone comprising adding sufficient gas to the feed to the zone to preclude liquid therefrom, said gas being non-condensable under the temperature and pressure in the zone.

In another aspect, the invention relates to a method of preventing liquid formation in a compressing zone by adding enough gas to the feed to said zone to preclude liquid therefrom, said gas being non-condensable under the temperature and pressure in the zone.

In another aspect, the invention relates to a method of precluding liquid from a compressing zone by using a portion of the gaseous effluent from a gas-liquid separation as an additive to the feed to the zone in an amount sufficient to preclude liquid from the zone, said portion being non-condensable under the temperature and pressure in the zone.

In another aspect, the invention relates to a method of passing a feedstock through a plurality of compressing zones under increasingly higher pressures, subjecting the effluent from each of the zones to cooling and then to a gas-liquid separation, and recycling a portion of the gaseous effluent from the separation as an additive to the feed to each zone in an amount sufficient to preclude liquid formation in and liquid from entering the zone, said gas being non-condensable under the temperature and pressure in a given zone.

In a system comprising a plurality of gas-liquid separation steps, feed to each separation step is usually compressed. Conventional gas compressors can be used, but periodic surging, liquid addition to, and liquid formation in such compressors must be avoided. It is an object of this invention to preclude liquid from a gas compressing zone. It is also an object of this invention to provide a method for maintaining a constant load on a gas compressing zone. A specific object is to prevent liquid addition to, and formation in, a gas compressing zone.

Other aspects, objects, and the several advantages of the invention will be apparent to one skilled in the art upon studying the specification, claims and drawing.

Accordingly, the invention provides a method for precluding liquid from a compressing zone by adding sufficient gas to the feed to the zone to prevent liquid addition to, and formation in, the zone, said gas being non-condensable under the temperature and pressure in the zone. Non-condensable gas can be obtained by subjecting the effluent from the zone to partial condensation and then to a liquid-gas separation, and recycling a portion of the gaseous effluent from the separation to the compressing zone. Further, the compressing zone described can be one of a plurality of such compressing zones, wherein the feed to each is subjected to increasingly higher pressures.

The drawing illustrates the concept of the invention comprising two compressing zones under different conditions of temperature and pressure.

In the drawing, feedstock comprising light hydrocarbons and hydrogen passes via line 4 to liquid knock-out drum 1, from which liquid is removed via line 16, and gaseous effluent passes via lines 5, 6, 7 and 10 to compressing zone 11. The effluent from the compressing zone passes through cooler 13 via line 12 to liquid-gas separating zone 2 via line 14. Gaseous effluent emerges from zone 2 via line 17, and a portion thereof passes via lines 8, 7 and 10 to compressing zone 11 in an amount sufficient to preclude liquid from the compressing zone. Under the conditions of the temperature and pressure prevailing in zone 11, the gas recycled is non-condensable, and thus prevents liquid addition to, and formation in, the zone. This recycle gas lowers the dew point of the saturated (wet) vapor being charged from drum 1 to compressor 11.

A second portion of the gaseous effluent from zone 2 passes via lines 17, 18 and 21 to compressing zone 24, which operates under conditions of higher pressure than zone 11. The effluent from zone 24 passes through cooler 25, and then via line 30 to liquid-gas separating zone 3. A portion of the gaseous effluent from zone 3 passes via lines 28, 27, 22, and 21 to zone 24 in an amount sufficient to prevent liquid addition to, and formation in, zone 24, said portion being non-condensable under the temperature and pressure in zone 24. This recycle gas lowers the dew point of the saturated vapor being charged from zone 2 to compressor 24.

A second portion of gaseous effluent from zone 3 passes via lines 28, 29 and 34 to compressing zone 35, which operates under conditions of higher pressure than zone 24. The effluent from zone 35 passes through cooler 36 and then via line 37 into liquid-gas separating zone 32. A portion of the gaseous effluent from zone 32 passes via lines 38, 40 and 34 to zone 35 in an amount sufficient to prevent liquid addition to, and formation in, zone 35, said portion being non-condensable under the temperature and pressure in zone 35. This recycle gas lowers the dew point of the saturated (wet) vapor being charged from zone 3 to compressor 35.

A second portion of gaseous effluent from zone 32 passes via line 41 through drier or desiccant zone 42, line 43, cooler 44 into fractionator 45. Overhead vapor 46 is cooled in 47 and passes via line 48 into overhead accumulator 49. Reflux 50 for tower 45 is removed on level control from the accumulator. Non-condensables from accumulator 49 pass via valve 52 on pressure control via line 51 and exchanger 44, and are removed, thusly heated, as fuel gas via line 53. Bottoms liquid passes from fractionator 45 via line 54, a portion being pumped via reboiler 55 to produce reboil vapors which are returned to the fractionator 45. The upper tower temperature is controlled by temperature controller 56 which actuates flow of heat exchange fluid to the reboiler 55. A second portion of bottoms liquid is passed via 57, the flow thereof being controlled in response to the liquid level of bottoms liquid in reboiler 55, by means of level controller 58, and is combined with liquid materials previously removed from zones 2, 3 and 32 via lines 20, 31 and 33, respectively. The combined liquids 33a along with an outside source of hydrocarbon which can be added to the system via line 33b, and bottoms 57 pass via line 57a to product surge vessel 59. Product vapor is removed from vessel 59 via line 60 on pressure control 61. Liquid 63 from vessel 59 is passed to vaporizer 64 on vaporizer liquid level control 65. Vapor is removed from vaporizer 64 via line 66 and is combined with vapor in line 60, and the admixture is removed via line 68 as a product of the process. Flow control means 70 regulates the withdrawal of product in line 68. Pressure in line 68 actuates control of steam used in vaporization. Pressure control means 72 actuates control of steam added via valve 73 into line 74.

It is apparent that the amount of gas recycled to each compressing zone can be controlled by control valves 9, 23 and 39. Further, other liquid and/or vapor hydrocarbons can be added to the effluents from the compressing zones via lines 15 and 26.

rality of compressing zones of increasingly higher pressures having a gas-liquid separation zone between each compression zone, liquefying a portion of the effluent gases from each of said compression zones by cooling, separating the cooled effluent into separate gas and liquid streams in a separation zone following each compression zone, and continuously recycling a portion of said gas stream from each separation zone to the feed to the preceding compression zone in an amount ranging from 5 to 50 volume percent of flow to each compression zone sufficient to preclude liquid formation in, and addition

EXAMPLE

Flow [1] in Pounds/Hour

| Component | Stream Number | | | | | | | | | | | | |
|---|---|---|---|---|---|---|---|---|---|---|---|---|---|
| | (4) | (15) | (18) | (20) | (26) | (29) | (31) | (41) | (33) | (53) | (57) | (68) | (33b) |
| Hydrogen | 16 | 58 | 74 | | 58 | 132 | 0 | 125 | 7 | 125 | | 7 | |
| Methane | 614 | 360 | 943 | 31 | 454 | 1,394 | 3 | 1,169 | 225 | 1,169 | | 259 | |
| Ethane | 2,824 | 1,114 | 3,409 | 529 | 1,870 | 5,237 | 42 | 3,026 | 2,211 | 2,107 | 919 | 3,701 | |
| Propane | 6,755 | 1,712 | 5,784 | 2,683 | 12,587 | 18,184 | 187 | 7,039 | 11,145 | 220 | 6,819 | 20,915 | 81 |
| Isobutane | 2,499 | 203 | 1,264 | 1,438 | 678 | 1,864 | 78 | 490 | 1,374 | | 490 | 6,577 | 3,197 |
| n-Butane | 2,941 | 199 | 1,255 | 1,885 | 576 | 1,729 | 102 | 371 | 1,358 | | 371 | 8,587 | 4,871 |
| Isopentane | 1,291 | 141 | 480 | 952 | 9 | 419 | 70 | 56 | 363 | | 56 | 1,650 | 209 |
| n-Pentane | 556 | 213 | 312 | 457 | 9 | 263 | 58 | 28 | 235 | | 28 | 805 | 27 |
| Isohexanes | 414 | 10 | 49 | 375 | | 34 | 15 | 2 | 32 | | 2 | 424 | |
| n-Hexane | 112 | | 8 | 104 | | 5 | 3 | | 5 | | | 112 | |
| Heptanes | 120 | | 3 | 117 | | 2 | 1 | | 2 | | | 120 | |
| Benzenes | 812 | | 37 | 775 | | 19 | 18 | | 19 | | | 812 | |
| Toluene | 65 | | 1 | 64 | | | 1 | | | | | 65 | |
| Total | 19,019 | 4,010 | 13,619 | 9,410 | 16,241 | 29,282 | 578 | 12,306 | 16,976 | 3,621 | 8,685 | 44,034 | 8,385 |

[1] Does not include recycle quantities. Recycle will vary from about 5% to 50% of flow.

OPERATING CONDITIONS

| | Temperature, °F. | Pressure, p.s.i.g. |
|---|---|---|
| Knock Out Drum (1) | 100 | 30 |
| Separator (2) | 100 | 150 |
| Separator (3) | 100 | 215 |
| Separator (32) | 100 | 460 |
| Surge Tank (59) | 84 | 165 |
| Deethanizer (45): | | |
| Top Temperature, °F | | 23 |
| Bottom Temperature, °F | | 152 |
| Pressure, p.s.i.g | | 430 |

| | Pressure, p.s.i.g. | | Temperature, °F. | |
|---|---|---|---|---|
| | Inlet | Outlet | Inlet | Outlet |
| Compression Zones: | | | | |
| Unit (11) | 30 | 160 | 100 | 185 |
| Unit (24) | 150 | 225 | 100 | 129 |
| Unit (35) | 215 | 470 | 100 | 153 |

Recycle gas is normally preset at a predetermined value ranging from 5 to 50 volume percent of the flow to the compressor. The recycle gas is leaner (contains lower percentage of heavier components) than the vapor or gas charged to compression, and the recycle gas depresses the dew point of the gas charged. Hence, any cooling or other condition change which would bring liquid in or cause liquid to be formed in the charge gas system will be offset by the recycle to the inlet of the compressor of this leaner gas. In the above operation, each recycle gas is 10 percent by volume of the charge to each compressor.

Reasonable variation and modification are possible within the spirit and scope of the invention, the essence of which is a method of precluding liquid from a compressing zone by adding sufficient gas to the feed thereto to prevent a liquid addition to, and formation in, the zone, said gas being non-condensable under the temperature and pressure in the zone.

We claim:

1. A method of separating gases of different boiling points and precluding liquid from compression zones under normal continuous operations which comprises passing a feedstock containing said gases through a plurality of compressing zones of increasingly higher pressures having a gas-liquid separation zone between each compression zone, liquefying a portion of the effluent gases from each of said compression zones by cooling, separating the cooled effluent into separate gas and liquid streams in a separation zone following each compression zone, and continuously recycling a portion of said gas stream from each separation zone to the feed to the preceding compression zone in an amount ranging from 5 to 50 volume percent of flow to each compression zone sufficient to preclude liquid formation in, and addition to, each compression zone, said gas stream being non-condensable under the temperature and pressure conditions in each compression zone to which a gas is recycled.

2. A method according to claim 1 wherein the gas stream removed from the last separation zone following the last compression zone in the series is passed to a fractionation zone wherein lower boiling gases are removed as overhead from said fractionation zone in a first stream and higher boiling materials are removed from the bottom of said fractionation zone, and wherein the liquid streams removed from said separation zones between said compression zones and the bottoms from said fractionation zone are collected together to form a product stream having a higher boiling range than said first stream.

3. A method according to claim 1 wherein a hydrocarbon-containing vapor is added to the effluent from at least one compression zone prior to separation of the compression zone effluent into said gas and liquid streams in a separation zone.

4. A method according to claim 1 wherein said gases in said feedstock comprise hydrogen, alkanes having from 1 to 7 carbon atoms per molecule, and aromatics.

References Cited

UNITED STATES PATENTS

| 3,186,182 | 6/1965 | Grossmann et al. | 62—26 |
| 3,228,201 | 1/1966 | Gaede | 62—26 XR |
| 3,257,813 | 6/1966 | Tafreshi | 62—26 XR |
| 3,319,428 | 5/1967 | Isaacson | 62—26 XR |

FOREIGN PATENTS

| 225,167 | 6/1962 | Austria. |
| 928,503 | 6/1963 | Great Britain. |

WILBUR L. BASCOMB, Jr., Primary Examiner

U.S. Cl. X.R.

62—26, 28; 203—26; 208—351